Jan. 5, 1937. C. I. WALKER 2,066,593
MEANS FOR PROTECTING AND LUBRICATING JOURNALS
Filed March 16, 1936
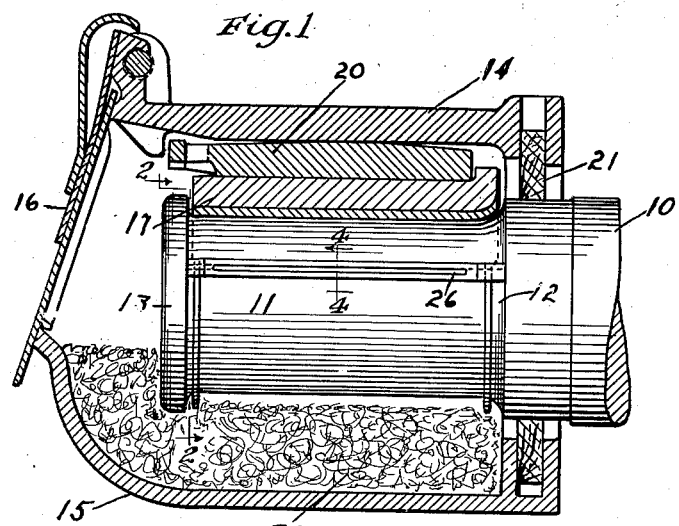
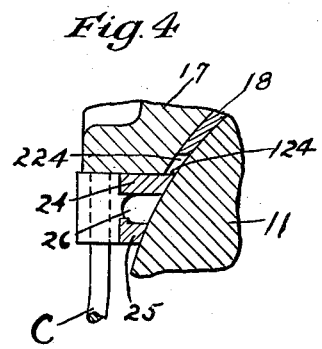
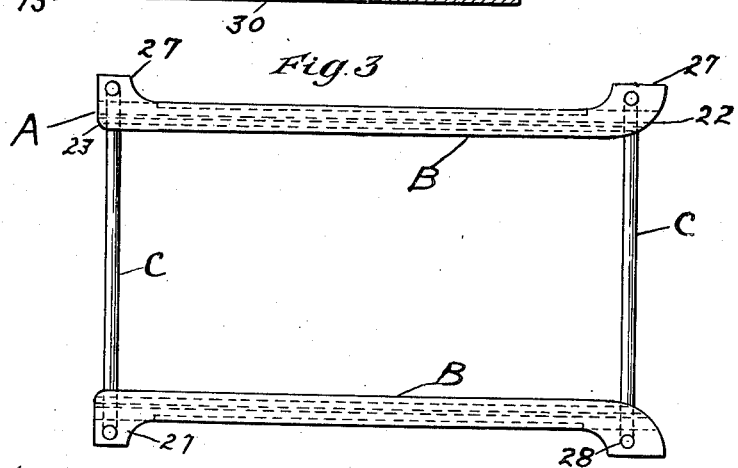
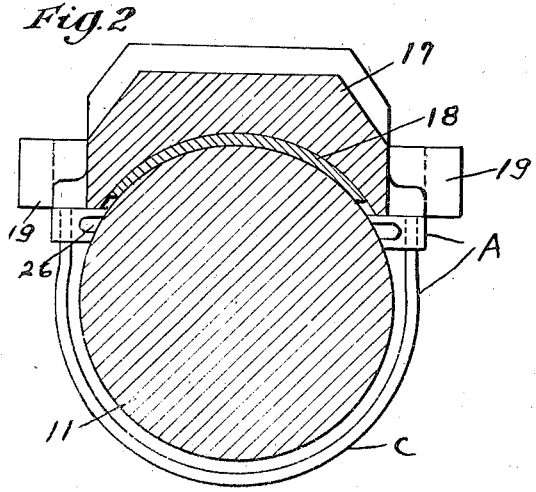
Inventor
Charles I. Walker
By Joseph Harris
His Atty.

Patented Jan. 5, 1937

2,066,593

UNITED STATES PATENT OFFICE 2,066,593

MEANS FOR PROTECTING AND LUBRICATING JOURNALS

Charles I. Walker, Los Angeles, Calif.

Application March 16, 1936, Serial No. 69,107

4 Claims. (Cl. 308—89)

This invention relates to improvements in means for protecting and lubricating journals, and more particularly, such means for railway car journals.

In the usual construction of railway cars, the journals of the car axles are extended at their ends into journal boxes each so formed as to provide a cellar or well in which is kept a mass of oil-soaked waste of sufficient quantity to always insure engagement thereof with the under side of the journal to thereby keep it lubricated. Experience has shown that, in operation, difficulties are frequently encountered with such journals due to various causes and which produce hot boxes and burned out brasses, notwithstanding the careful and frequent inspection on the part of the railroads. Often, the oil waste is caught or picked up by the journal and carried thereby so as to get wedged in between the journal and the usual brass or bearing plate on the upper side of the journal. This results in squeezing the oil out of the waste, drying it, and causing excessive friction with the result sometimes of ignition of the waste and consequent melting of the usual babbitt or other facing metal of the bearing. Bad scoring of the journal may also be so produced, partly from the wedged in waste and partly from the displacement of the bearing plate or brass. Further, and notwithstanding the use of dust guards and journal box lids made as tight as practicable, fine grit and other foreign matter gets into the journal boxes with the result that such foreign matter gets applied to the journal and is carried thereby between the journal and bearing plate thus also causing scoring and undue heating.

One object of this invention is to provide simple, relatively inexpensive and highly efficient means for journals, and more especially railway car journals, to prevent either waste or particles of grit, dust or other foreign matter from being carried by the rotating journal beneath the usual brass or bearing plate and which also is designed to insure proper lubrication of the journal, regardless of the direction of its rotation.

Another object of the invention is to provide means of the type indicated in the preceding paragraph such that the same may be readily applied to journals and journal box constructions now in service on the railroads as well as any new constructions, without the necessity of modifying the journal boxes or brasses in any way.

More specifically, an object of the invention is to provide means of the character indicated in the preceding paragraphs such that two members are yieldingly held in engagement with the surface of the journal on opposite sides thereof above the horizontal center line, said members being further characterized by the fact that they are provided with longitudinally extending recesses or grooves adapted to receive grit or like foreign matter, said recesses or grooves being vented to allow any accumulations of such foreign matter to drop back into the well of the journal box.

Other objects of the invention will more clearly appear from the description and claims hereinafter following.

In the drawing forming a part of this specification, Fig. 1 is a part vertical sectional view, part elevational view of a railway car journal box arrangement showing the improvements in connection therewith. Fig. 2 is an enlarged transverse vertical sectional view of the journal and adjacent parts corresponding substantially to the line 2—2 of Fig. 1. Fig. 3 is a top plan view of the improved protecting and lubricating means, detached. And Fig. 4 is an enlarged detail sectional view corresponding substantially to the line 4—4 of Fig. 1.

In said drawing, 10 indicates one end portion of a railway car axle, the same being formed with the usual journal 11 having a fillet 12 at its end adjacent the main portion of the axle, and the usual collar 13 at its outer end. As customary, the journal is disposed within a journal box indicated generally by the reference 14, the latter having the usual lubricant well or chamber 15 at the bottom and provided with a spring controlled pivoted lid or cover 16. The journal is adapted to have its bearing on the usual bearing plate or brass 17 shown faced, as customary, with babbitt or other anti-friction metal surface 18. Said brass is provided as common to most brasses now in service, with laterally extended lugs or flanges 19—19 and a wedge or key 20 is interposed therebetween and the top wall of the journal box. A dust guard 21 is also indicated. All of the parts so far described are or may be of usual and well known construction.

The improved means for protecting and lubricating the journal is indicated broadly by the reference character A. Said means comprises, broadly, two longitudinally extending members B—B and two preferably spring steel wire connectors C—C.

Each of the members B may be of any suitable material but preferably are comprised of brass. The same are of a length corresponding to the total length of the journal 11 and are rounded at their ends as indicated at 22 and 23 to conform with the inner fillet 12 and fillet joining the collar 13, respectively to thereby insure that no waste or other foreign matter may pass by the members B at any point along the journal. Each member B, on its inner longitudinal face, is curved to conform to and fit the surface of the journal, as most clearly indicated in Fig. 4. Further, each member B is formed with an upper horizontal section 24, and a lower horizontal section 25 so separated as to leave or provide a recess or chamber 26 extending the entire length thereof, for the purpose hereinafter described. Said recess or chamber 26, as best indicated in Figs. 1 and 4, is open or vented on its outer side for the greater part of its length so that any foreign matter accumulating therein may be flushed out and allowed to drop back into the well of the journal box. It will be noted also, referring particularly to Fig. 4, that the upper section 24 of each member B is projected inwardly as indicated at 124, beyond the side flange or lug 19 of the bearing or brass, this distance corresponding to the thickness of the babbit or other surfacing material 18 carried by the brass and from which it is circumferentially separated a short distance as shown in Fig. 4, to thereby provide a longitudinally extending recess or pocket 224.

At their ends, the members B are formed with outwardly turned extensions 27—27 in which the upper ends of the spring wires C are inserted and preferably welded thereto as indicated at 28—28. Each of the spring wires C is of generally semicircular form and of such radius as to slightly clear the journal at all points as is clear from Fig. 2. Furthermore, the circumferential extent of the spring wires C is such that the members B are disposed above the center line or diameter of the journal and also so as to have both members B engage the lateral extensions of the brass.

As is customary, the railway car journal boxes are provided with a mass of oil-soaked waste as indicated at 30 in Fig. 1 in the well of the box and thus insure a wiping action against the journal to lubricate the latter.

With the construction as shown and described, it is apparent that, should any waste be caught by the journal while rotating in either direction, the waste will first strike the lower section 25 of the corresponding member B and will thereby be prevented from being moved up under the journal bearing and particularly, will be prevented from getting wedged into the spaces 224, thus preventing what is commonly termed "waste grabbing" and preventing hot boxes and scoring heretofore a frequent occurrence from waste grabbing. In the case of any fine grit or other foreign particles being wiped onto the journal and carried up thereby, in either direction, should any of it succeed in passing the lower scraper-like section 25 of the corresponding member B, it will be trapped in the longitudinal recess or chamber 26 which will contain a more or less film-like quantity of oil therein and said foreign matter will gradually be vented outwardly and allowed to drop back into the waste of the box as will be apparent. Further, on account of the projecting portion 124 of the upper section 24 of each member B, the same will serve, dependent upon the direction of rotation of the journal, to hold a certain quantity of the lubricant on top thereof in the confined space 224, as best appears in Fig. 4, thus insuring proper lubrication of the journal at all times, and particularly on what may be termed the downwardly moving side of the journal at any particular instant.

As will be evident from the preceding description, the improved device A may be readily applied to journals now in service as well as on new equipment and all that is necessary is to insert the same through the usual journal box opening; slip it beneath the journal and lift it into position, the spring wires C being of sufficient flexibility to permit the necessary spreading of the members B while passing upwardly beyond the horizontal diameter of the journal. Once in position, the device cannot become displaced either vertically or longitudinally and effectively serves to protect and lubricate the entire length of the journal surface.

Although there has herein been shown and described what is now considered the preferable manner of carrying out the invention, the same is by way of illustration and not by way of limitation, inasmuch as various changes may be made without departing from the spirit of the invention. All such changes and modifications are contemplated as come within the scope of the appended claims.

What is claimed is:—

1. Means for protecting and lubricating a journal adapted to be rotated in contact with an upper bearing and lubricated by oil waste at its under side, said means comprising: a pair of members arranged to extend lengthwise of and in engagement with opposite sides of the journal above its horizontal center; and yieldable means associated with said members for normally urging the same toward each other and into contact with the journal, each of said members having journal-engaging sections circumferentially separated with respect to the surface of the journal to thereby provide an accumulating recess for foreign matter.

2. Journal protecting and lubricating means as claimed in claim 1 wherein each of said recesses extends the full length of its corresponding member and is vented to its outer side.

3. Means for protecting and lubricating a journal having a fillet at one end and a collar at its opposite end and adapted to be rotated in contact with an upper bearing having lateral extensions thereon, said means comprising: a pair of members arranged to extend the full length of the journal and conformed at their ends to said fillet and collar, each of said members being provided with a longitudinally extending recess on its inner face for the reception of foreign matter therein, said recess being vented to permit discharge of foreign matter therefrom; and yieldable means associated with said members for normally urging the same toward each other and into contact with the journal on opposite sides of the latter above its horizontal center line, said members being adapted to engage and be maintained horizontally in position by said lateral extensions of the bearing.

4. Means for protecting and lubricating a journal having a fillet at one end and a collar at its opposite end and adapted to be rotated in contact with an upper bearing having lateral extensions and lubricated by oiled waste at its under side, said means comprising: two longitudinally extending members each conformed on its inner face to the curvature of the journal surface and at its ends to the fillet and collar, each of said members having a centrally disposed, longitudinally extending recess on its inner face thereby providing upper and lower journal-engaging sections; and a spring wire at each end of said members, each said wire being of generally semi-circular form and having its ends united to the respective ends of said members, said wires being adapted to partially encircle the lower portion of the journal in spaced relation thereto and of such extent as to maintain said members in engagement with said lateral extensions of the bearing.

CHARLES I. WALKER.